May 20, 1969
W. J. STRAUSS
3,445,315
PLASTIC WELDING APPARATUS
Filed March 6, 1964
Sheet 1 of 3
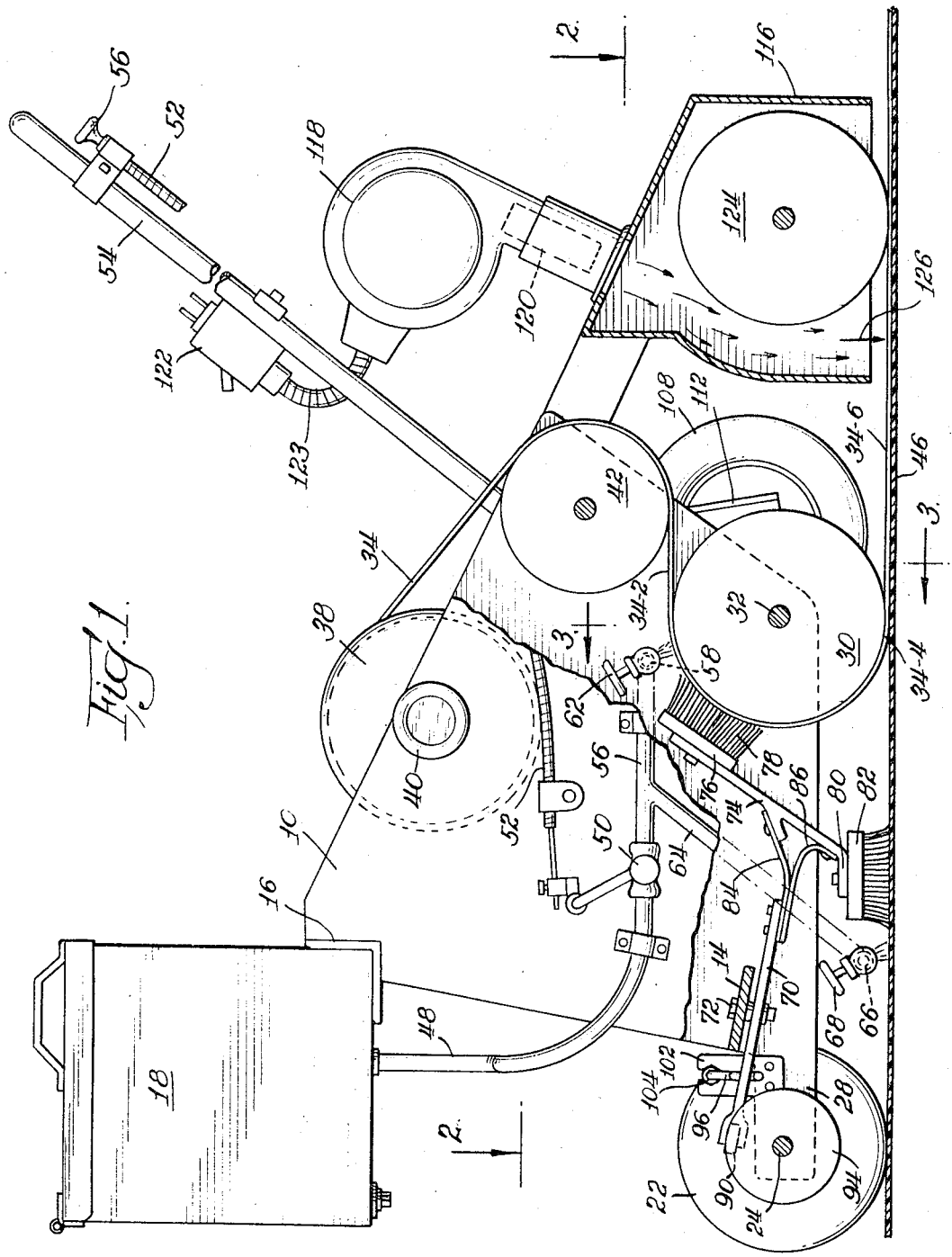
INVENTOR.
William J. Strauss
BY
Dominik, Rudy & Stein
Att'ys.

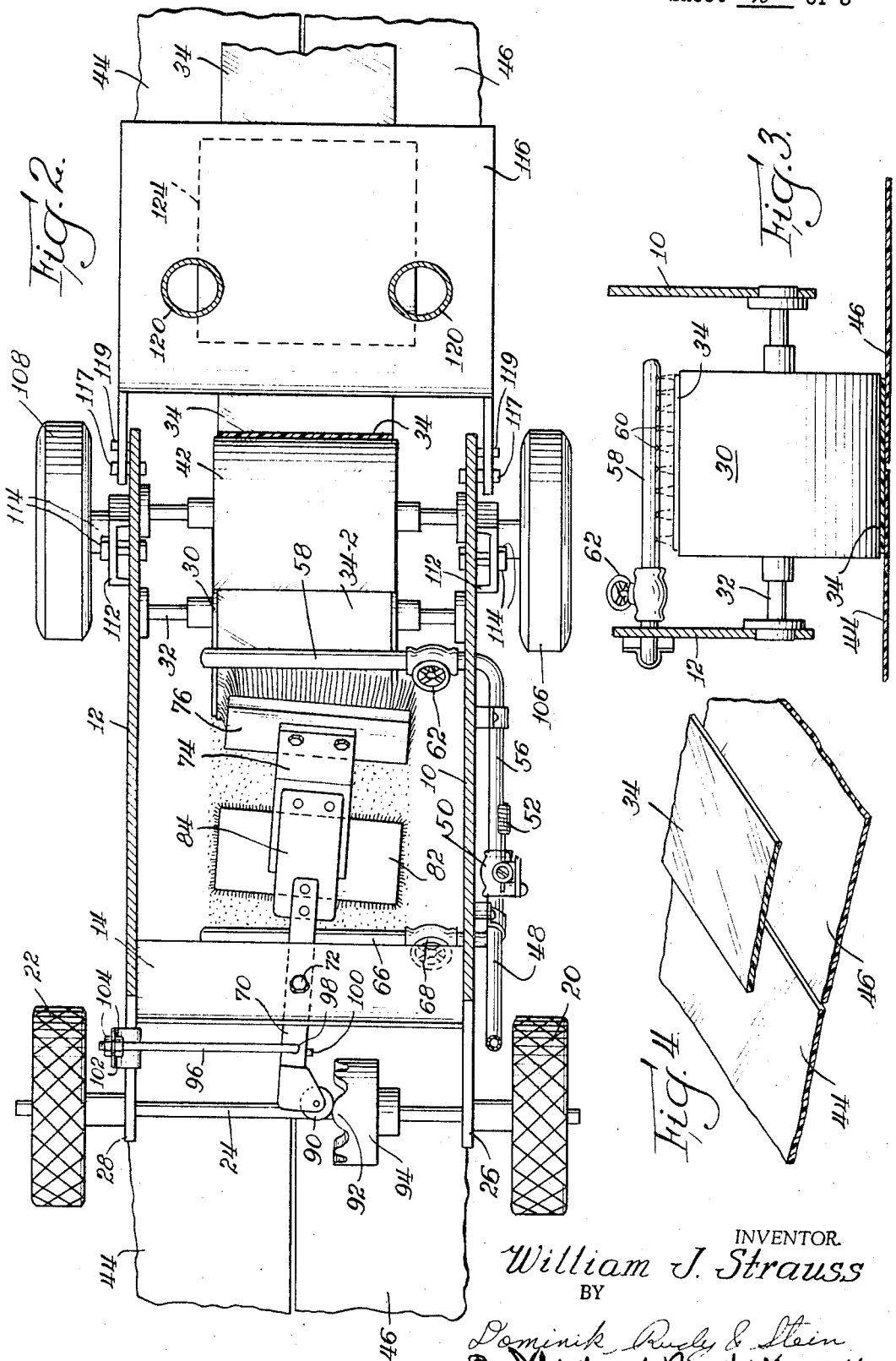

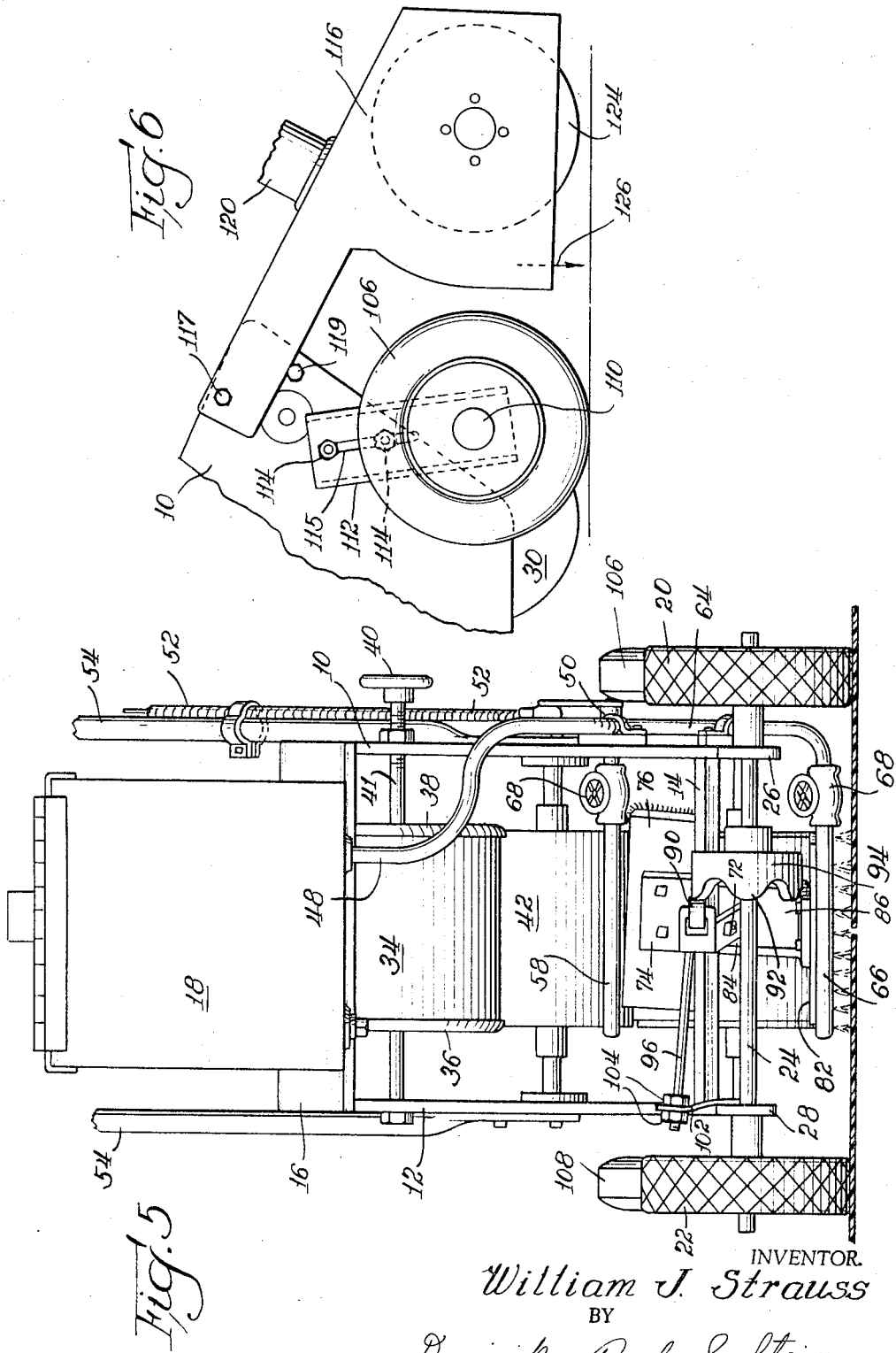

United States Patent Office 3,445,315
Patented May 20, 1969

3,445,315
PLASTIC WELDING APPARATUS
William J. Strauss, Champaign, Ill., assignor to The Dow Chemical Company, Midland, Mich., a corporation of Delaware
Filed Mar. 6, 1964, Ser. No. 349,984
Int. Cl. C09j 5/02, 5/10
U.S. Cl. 156—575
16 Claims

ABSTRACT OF THE DISCLOSURE

A method and machine for welding two plastic sheets together in a permanent fashion. The method involves, generally, the solvent wetting of the abutted edge portions of two sheets or films of plastic and one side of a capping strip followed by a brush-in application of the solvent. The strip, wet end down, is then pressed down upon the wetted edge portions to permanently affix the two sheets together.

The machine in its broadest aspects comprises a vehicle having a supply of capping strip and a series of rollers for guiding the strip onto the abutted edge portions of the two plastic sheets to be joined. Prior to actual contact of the strip with the sheets, solvent is applied and worked into the strip and the edge portions by an oscillating brush so that a more permanent bond or weld is effected. Heat also may be applied to further enhance using of the sheets.

---

This invention relates to the welding of plastic sheets and more particularly to a novel machine and method for welding a plastic capping strip upon the abutted ends of two sheets of plastic to join them into a unitary leakproof structure.

Current procedure involves abutting the two edges together and then wetting the edge portion with solvent using a paint brush. A capping strip, the under surface of which has been wetted with solvent, is then applied to weld the sheets together.

The solvent is usually applied by hand. Usually, two men, one to wet and roll out the strip and the other to apply the solvent to the abutted sheets with a paint brush, are involved. A single man could perform both operations, but the solvent frequently dries too fast. Also, the accuracy and speed of the application suffers if only one operator does the job.

One object of this invention is to provide a novel method for welding two plastic sheets or films together with a more permanent and leakproof bond.

Another object is to provide a machine which can carry out said method in an efficient manner.

A still further ovject is to provide a machine which can apply a capping strip upon the abutted ends of two plastic sheets automatically at relatively high speed.

Still another object is to enable such application by a singular inexperienced workman.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

A method and a machine have now been uniquely devised which welds two plastic sheets together in a more permanent fashion. The method involves the solvent wetting of the abutted edge portions of two sheets or films of plastic and one side of a capping strip followed by a brush-in application of the solvent. The strip, wet end down, is then pressed down upon the wetted edge portions to permanently fasten two sheets together. The machine, which accomplishes this novel method, in its broadest aspects comprises a vehicle having a supply of capping strip, preferably on a supply roll 35. A series of rollers (30 and 42) guide the strip onto the abutted edge portions of the two plastic sheets to be joined. Prior to actual contact of the strip with the sheets, however, solvent is applied and worked into the strip and the edge portions by an oscillating brush so that a more permanent bond or weld is effected. An optimal feature is the heat applying means which applies heat to the finished weld to further enhance fusing of the sheets.

For a fuller understanding of the nature and objects of the invention, reference should be had to the following detailed description taken in connection with the accompanying drawings, in which:

FIG. 1 is a side elevation of one embodiment of a machine unit for practicing the invention, with the near side plate partly broken away.

FIG. 2 is a cross-sectional view, of the machine taken along line 2—2 of FIG. 1.

FIG. 3 is a cross-sectional view taken on line 3—3 of FIG. 1, to indicate the manner of application of solvent to the capping strip as it revolves around the deck roller.

FIG. 4 is a perspective view of the base sheets and the capping strip in the positions they occupy when finished.

FIG. 5 is a front elevational view of the machine.

FIG. 6 is a fragmentary side elevation of the rear end of the machine as it would appear when arranged to roll from place to place while inactive.

Similar reference characters refer to similar parts throughout the several views of the drawings.

As best seen in FIGS. 1 and 5, the embodiment selected to illustrate the machine of the invention comprises a wheeled vehicle having a substantially open frame consisting of side plates 10 and 12 suitably braced in parallel spaced relationship as by means of a cross plate 14 near the bottom and a cross piece 16 near the top. The cross piece forms a support for a solvent container 18.

In the operative position illustrated in FIG. 1, the weight is carried mostly at the front on front wheels 20 and 22 on an axle 24 journaled in lower forwardly directed extensions 26 and 28 of side plates 10 and 12. At the rear, the side plates carry a deck roller 30 on a transverse axle 32, and this deck roller completes a 3-point support for the equipment when it is in active operation.

The capping strip 34 is contained on a supply roll 35 having end plates 36 and 38. Adjustment means comprising an adjustment wheel 40 on a threaded right-hand shaft 41 permits adjustment of plate 38 with respect to plate 36 whereby various width capping strip may be utilized in the machine.

From the supply roll 35, the capping strip 34 threads downwardly and to the rear, as best indicated in FIG. 1, around an idler roller 42, and then forward in a horizontal manner at 34–2 and around the deck roller 30 into contact at 34–4 with the plastic sheets 44 and 46 to be welded together. At the point 34–4 the capping strip has reached its final position and remains stationary in a rearward reach 34–6.

Means are provided for applying solvent in accurately controlled quantity to the capping strip and also to the abutting edge portions of the plastic sheets 44 and 46. Solvent from the container 18 descends through conduit 48 and then through valve 50 which permits the operator to adjust and turn off the solvent supply. Suitable remote control means for the valve may be used such as a conventional Bowden wire 52 which extends to the rear and up alongside one leg of the U-shaped handle 54 whereby the machine may be pushed along over the abutted edges of the sheets to be joined. The Bowden wire 52 ends in a conventional manual control head 56, conveniently located below and near the handle 54.

Beyond valve 50, conduit 48 is forked and includes a horizontal reach 56 leading to the transverse discharge tube 58 (see FIG. 3) whereby solvent is sprayed onto the capping strip 34 as it travels over deck roller 30. The spray tube 58 is provided with a multiplicity of spaced spray openings 60, which are spaced a little closer together nearer the dead end at the right in FIG. 3 so that the lower pressure near the dead end due to flow along the tube will secure a substantially uniform distribution of solvent from side to side of the capping strip. The discharge rate may also be accurately controlled through the use of capping strip discharge valve 62.

The other branch of the conduit 48 extends downward and forward at 64 to deliver solvent to a second transverse spray tube 66 similar to the spray tube 58 and with its flow adjustable by a needle valve 68. Tube 58 sprays the abutting edge portion of the two plastic sheets to be welded together with capping strip 34.

Means are provided for brushing the wetted surfaces of the edges of the plastic sheets 44 and 46 and the capping strip 34 to work the solvent into the surface on which it lies, and prepare the surfaces for forming a firm and dependable weld under the pressure of the deck roller 30. To accomplish this, the machine of this invention has a brush-carrying bar 70 journaled on a pivot 72 mounted on the cross piece 14. The rear reach of the bar carries a plate 74 having a brush 76 at its upper end (see FIGS. 1 and 2) and the bristles 78 are in continuous engagement with the moving capping strip as that strip emerges from below the spray tube 58. The lower end of the plate 74 has a horizontal portion at 80 carrying a brush 82 similar to the brush 76. This brush brushes the wetted edge portions of the abutted plastic sheets 44 and 46 immediately after they have been solvent wetted by the spray tube 66.

The plate 74 is preferably affixed to the rear end of the bar 70 by resilient means such as leaf springs 84 and 86 to permit the brushes to be applied with a slight resilience in their contact with the surfaces on which they operate.

The bar 70 is reciprocated through a small angle about its pivot 72. This is accomplished by providing the front end of the bar 70 with a roller 90 which is adapted to ride on the cam surface 92 of a cam wheel 94 (see FIG. 2). Wheel 94 is rigidly mounted on shaft 24 (see FIG. 5).

Resilient means are provided for holding the bar 70 and roller 90 pressed against serrations 92. A simple transverse rod 96 (see FIG. 5) having a downwardly extending finger 100 residing in a hole 98 in the rod 70 at one end and affixed to the forked upper end a leaf spring 102 serves as one form of such a resilient means. Spaced nuts 104 permit adjustment of the pressure of the roller 90 against the serrations 92. Other structures for resilient means could obviously also be used.

In warm environments, a suitable weld can be secured with the equipment already described. However, when the environment is cool, a heat trailer unit is preferably employed. It comprises an inverted hood 116 and hot air blowers 118 (preferably two) which are adapted to blow air into the hood over electric heating elements at 120. A switch 122 on the handle 54, connected to the blowers by an electric cord 123 controls operation of the blowers. Inside the hood is an auxiliary deck roller 124 which is bathed in the warm air entering the hood, and presses down on the capping strip. Also, the air from the heater travels principally in front of the roller 124 at 126 to warm the capping strip prior to engagement by the warm deck roller 124. By such means, the weld is enhanced even in cold weather.

The entire heat trailer unit is pivoted on a transverse axis at 117. Stop 119 limits the clockwise movement of such pivot action. Thus the deck roller 124 may be lifted off the deck when the wheels 106 are lowered, as shown in FIG. 6.

Means are provided to enable movement of the equipment from place to place in an inactive condition. This is accomplished by the use of pick-up wheels 106 and 108 (FIGS. 2 and 6). Each pick-up wheel is journaled on a pivot 110 carried by a slide bar 112 which is fastened to the frame by means of clamping bolts 114, within slot 115 either in the position of FIGS. 1 and 5, where the pick-up wheels clear the road and the weight is carried by the deck roller 30, or in the lower position of FIG. 6 where the pick-up wheels carry the weight, and the deck roller 30 rides above the road surface. When the deck roller 30 is thus elevated, it is inoperative and does not withdraw capping strip 34.

OPERATION

In operation, the strip 34 is threaded around the idler roller 42 and deck roller 30 into contact with the plastic sheets 44 and 46 which lay flat against a ground surface. The flow-regulator valves 62 and 68 are adjusted to provide optimum supply of solvent. As the operator moves the machine over the plastic sheets, the solvent dispensed is scrubbed into the capping strip and into the edge portions of the plastic sheets by the vibratory movement of brushes 76 and 82. As the machine travels, the freshly wetted and scrubbed surfaces meet at 34-4 and form a firm weld under the weight of the roller 30.

Certain variations or equivalent structures can be utilized for the parts described in detail above. For example, an application roll for each solvent spray means could be utilized and it could be a transversely vibrating roll if one wished to eliminate or supplement the unique action of the brushes described. A vibratory mechanism for each brush could also be utilized in place of the wobble wheel mechanism shown. The transport wheel assembly could be a pivot mechanism such as utilized for the heat trailer. The heat generating means for the heat trailer roll could be revised or supplemented by the use of a roll with electrical heat means built into the roll. Other variaitons are also possible.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A machine for welding a plastic capping strip upon the abutted ends of two plastic sheets whereby a unitary leakproof continuous sheet can be easily formed comprising wheeled vehicle means, a supply of capping strip on said vehicle means, means for guiding said capping strip adjacent the abutted edges of said two sheets, pressure means acting upon said strip to press said strip against the edges of said sheets, and plastic solvent supply and application means whereby solvent is applied to said capping strip and the ends of said sheets prior to contact of said strip with said ends.

2. A machine for welding a plastic capping strip upon the abutted ends of two plastic sheets whereby a unitary leakproof continuous sheet can be easily formed comprising wheeled vehicle means, a supply of capping strip on said vehicle means, said supply comprising an indefinite length of capping strip rolled on a supply roll, means for guiding said capping strip adjacent the abutted edges of said two sheets, pressure means acting upon said strip to press said strip against the edges of said sheets, and plastic solvent supply and application means whereby solvent is applied to said capping strip and the ends of said sheets prior to contact of said strip with said ends.

3. A machine for welding a plastic capping strip upon the abutted ends of two plastic sheets whereby a unitary leakproof continuous sheet can be easily formed comprising wheeled vehicle means, a supply of capping strip on said vehicle means, means for guiding said capping strip adjacent the abutted edges of said two sheets, pressure means acting upon said strip to press said strip against the edges of said sheets, said guide and pressure means including deck roller around which said strip travels and is pressed against the edge portion of said ends of said sheets, and plastic solvent supply and application means whereby solvent is applied to said capping strip and the ends of said sheets prior to contact of said strip with said ends.

4. A machine for welding a plastic capping strip upon the abutted ends of two plastic sheets whereby a unitary leakproof continuous sheet can be easily formed comprising wheeled vehicle means, a supply of capping strip on said vehicle means, means for guiding said capping strip adjacent the abutted edges of said two sheets, pressure means acting upon said strip to press said strip against the edges of said sheets, said guide and pressure means including a deck roller around which said strip travels and is pressed against the edge portion of said ends of said sheets and the weight of said wheeled vehicle means, said deck roller acting as a wheeled support for said vehicle means when in operative condition.

5. A machine for welding a plastic capping strip upon the abutted ends of two plastic sheets whereby a unitary leakproof continuous sheet can be easily formed comprising wheeled vehicle means, a supply of capping strip on said vehicle means, means for guiding said capping strip adjacent the abutted edges of said two sheets, pressure means acting upon said strip to press said strip against the edge of said sheets, and plastic solvent supply and application means whereby solvent is applied to said capping strip and the ends of said sheets prior to contact of said strip with said ends, comprising a solvent container, conduit means extending therefrom and solvent application means positioned to apply solvent to said capping strip and the edge portion of said abutted ends of said sheet.

6. The machine of claim 5 wherein said solvent application means comprises spray tubes communicating with said solvent container via said conduits and positioned to apply solvent to said capping strip and to said edge portions of said sheets.

7. The machine of claim 5 wherein said solvent application means comprises spray tubes communicating with said solvent container via said conduits and positioned to apply solvent to said capping strip and to said edge portion of said sheets and vibratory brush means which contact the sprayed portion of said strip and said edge portions to work the solvent into said strip and sheets.

8. A machine for welding a plastic capping strip upon the abutted ends of two plastic sheets whereby a unitary leakproof continuous sheet can be easily formed comprising wheeled vehicle means, a supply of capping strip on said vehicle means, means for guiding said capping strip adjacent the abutted edges of said two sheets, pressure means acting upon said strip to press said strip against the edge of said sheets, plastic solvent supply and application means whereby solvent is applied to said capping strip and the ends of said sheets prior to contact of said strip with said ends, and a heat trailer unit affixed to said wheeled vehicle means and having means within said unit for applying heat to said strip and the edge portion of said abutted ends of said sheets whereby the weld will be enhanced even under cold environments.

9. The machine of claim 8 wherein said means for applying heat comprises a heated roller and means to heat said roller.

10. The machine of claim 8 wherein said heat trailer unit comprises a hood affixed to said wheeled vehicle means in a trailing position, a heated roller journaled thereto and in contact with said strip and the edge portion of said abutted ends of said sheets when in operative position and at least one hot air blower positioned to blow hot air upon said roller at the front end thereof.

11. A machine for welding a plastic capping strip upon the abutted ends of two plastic sheets whereby a unitary leakproof continuous sheet can be easily formed comprising wheeled vehicle means, a supply of capping strip on said vehicle means, means for guiding said capping strip adjacent the abutted edges of said two sheets, pressure means acting upon said strip to press said strip against the edge of said sheets, plastic solvent supply and application means whereby solvent is applied to said capping strip and the ends of said sheets prior to contact of said strip with said ends, and transport means whereby said vehicle means may be easily transported in an inoperative condition comprising pick-up wheels pivoted on a pivot affixed to said vehicle means whereby said vehicle means may be supported in an upward position.

12. A machine for welding a plastic capping strip upon the abutted ends of two plastic sheets whereby a unitary leakproof continuous sheet can be easily formed comprising a wheeled vehicle capable of rolling over said abutted ends and having a frame and two laterally spaced wheels, a supply of capping strip contained on a supply roll journaled upon said frame, a deck roller longitudinally spaced from said two wheels and providing the third point of wheel support for said frame when in operative position, and strip guide means to lead said strip from said supply roll and around said deck roller, a solvent container affixed to said frame, conduit means extending therefrom, and spray means at the end of said conduits and in communication therewith and positioned to spray solvent upon said capping strip and to the edge portions of said sheets prior to the joining of said strip with the edge portion of said abutted ends of said sheet as said machine is transported along the line defined by said ends.

13. A machine for welding a plastic capping strip upon the abutted ends of two plastic sheets whereby a unitary leakproof continuous sheet can be easily formed comprising a wheeled vehicle capable of rolling over said abutted ends and having a frame and two laterally spaced wheels, a supply of capping strip contained on a supply roll journaled upon said frame, a deck roller longitudinally spaced from said two wheels and providing the third point of wheel support for said frame when in operative position, and strip guide means to lead said strip from said supply roll and around said deck roller, a solvent container affixed to said frame, conduit means extending therefrom, and spray means at the end of said conduits and in communication therewith and positioned to spray solvent upon said capping strip and to the edge portions of said sheets prior to the joining of said strip with the edge portion of said abutted ends of said sheet as said machine is transported along the line defined by said ends, and vibratory brush means which contact the sprayed portions of said strip and said edge portions to work the solvent in.

14. A machine for welding a plastic capping strip upon the abutted ends of two plastic sheets whereby a unitary leakproof continuous sheet can be easily formed comprising a wheeled vehicle capable of rolling over said abutted ends and having a frame and two laterally spaced wheels, a supply of capping strip contained on a supply roll journaled upon said frame, a deck roller longitudinally spaced from said two wheels and providing the third point of wheel support for said frame when in operative position, and strip guide means to lead said strip from said supply roll and around said deck roller, a solvent container affixed to said frame, conduit means extending therefrom, and spray means at the end of said conduits and in communication therewith and positioned to spray solvent upon said capping strip and to the edge portions of said sheets prior to the joining of said sheet as said machine is transported along the line defined by said ends, and vibratory brush means which contact the sprayed portions of said strip and said edge portions to work the solvent in, and a heat trailer unit comprising a hood affixed to said wheeled vehicle in a trailing position, a heated roller journaled thereto and in contact with said strip and the edge portion of said abutted ends of said sheets when in operative position and at least one hot air blower positioned to blow hot air upon said roller at the front end thereof.

15. A machine for welding a plastic capping strip upon the abutted ends of two plastic sheets whereby a unitary leakproof continuous sheet can be easily formed comprising a wheeled vehicle capable of rolling over said abutted ends and having a frame and two laterally spaced wheels, a supply of capping strip contained on a supply roll journaled upon said frame, a deck roller longitudinally spaced from said two wheels and providing the third point of wheel support for said frame when in operative position, and strip guide means to lead said strip from said supply roll and around said deck roller, a solvent container affixed to said frame, conduit means extending therefrom, and spray means at the end of said conduits and in communication therewith and positioned to spray solvent upon said capping strip and to the edge portions of said sheets prior to the joining of said strip with the edge portion of said abutted ends of said sheet as said machine is transported along the line defined by said ends, and vibratory brush means which contact the sprayed portions of said strip and said edge portions to work the solvent in, and transport means whereby said vehicle means may be easily transported in an inoperative condition comprising pick-up wheels pivoted on a pivot affixed to said vehicle means whereby said vehicle means may be supported in an upward position.

16. A machine for welding a plastic capping strip upon the abutted ends of two plastic sheets whereby a unitary leakproof continuous sheet can be easily formed comprising a wheeled vehicle capable of rolling over said abutted ends and having a frame and two laterally spaced wheels, a supply of capping strip contained on a supply roll journaled upon said frame, a deck roller longitudinally spaced from said two wheels and providing the third point of wheel support for said frame when in operative position, and strip guide means to lead said strip from said supply roll and around said deck roller, a solvent container affixed to said frame conduit means extending therefrom, and spray means at the end of said conduits and in communication therewith and positioned to spray solvent upon said capping strip and to the edge portions of said sheets prior to the joining of said strip with the edge portion of said abutted ends of said sheet as said machine is transported along the line defined by said ends, and vibratory brush means which contact the sprayed portions of said strip and said edge portions to work the solvent in, and a heat trailer unit comprising a hood affixed to said wheeled vehicle in a trailing position, a heated roller journaled thereto and in contact with said strip and the edge portion of said abutted ends of said sheets when in operative position and at least one hot air blower positioned to blow hot air upon said roller at the front end thereof, and transport means whereby said vehicle means may be easily transported in an inoperative condition comprising pick-up wheels pivoted on a pivot affixed to said vehicle means whereby said vehicle means may be supported in an upward position.

References Cited
UNITED STATES PATENTS

| | | | |
|---|---|---|---|
| 2,367,725 | 1/1945 | Lindh et al. | 156—304 |
| 2,372,737 | 4/1945 | Phillips | 156—306 X |
| 2,681,877 | 6/1954 | Seymour | 156—304 X |
| 3,314,844 | 4/1967 | Hadley | 156—505 X |
| 3,326,736 | 6/1967 | Ortel | 156—304 X |

HAROLD ANSHER, *Primary Examiner.*

U.S. Cl. X.R.

156—304, 308, 578